United States Patent
Jotwani

(10) Patent No.: US 11,928,780 B2
(45) Date of Patent: *Mar. 12, 2024

(54) SCENE MODEL ENRICHMENT USING SEMANTIC LABELS

(71) Applicant: Apple Inc., Cupertino, CA (US)

(72) Inventor: Payal Jotwani, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,183

(22) Filed: Jul. 20, 2022

(65) Prior Publication Data

US 2022/0358721 A1 Nov. 10, 2022

Related U.S. Application Data

(63) Continuation of application No. 17/158,208, filed on Jan. 26, 2021, now Pat. No. 11,430,181.

(60) Provisional application No. 62/982,335, filed on Feb. 27, 2020.

(51) Int. Cl.
| | |
|---|---|
| *G06T 17/00* | (2006.01) |
| *G06F 18/21* | (2023.01) |
| *G06F 18/232* | (2023.01) |
| *G06F 18/24* | (2023.01) |
| *G06T 7/50* | (2017.01) |
| *G06T 15/20* | (2011.01) |
| *G06T 17/20* | (2006.01) |
| *G06T 19/20* | (2011.01) |
| *G06V 20/00* | (2022.01) |

(52) U.S. Cl.
CPC ......... *G06T 17/20* (2013.01); *G06F 18/2163* (2023.01); *G06F 18/232* (2023.01); *G06F 18/24* (2023.01); *G06T 7/50* (2017.01); *G06T 15/20* (2013.01); *G06T 19/20* (2013.01); *G06V 20/00* (2022.01); *G06T 2207/10028* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 10,824,923 B1 * | 11/2020 | Forster | G06V 20/00 |
| 2017/0193706 A1 * | 7/2017 | Lo | G06T 19/006 |
| 2020/0342674 A1 * | 10/2020 | Chen | G06T 7/50 |

* cited by examiner

*Primary Examiner* — Martin Mushambo
(74) *Attorney, Agent, or Firm* — Fernando & Partners, LLP

(57) ABSTRACT

In one implementation, a method of enriching a three-dimensional scene model with a three-dimensional object model based on a semantic label is performed at a device including one or more processors and non-transitory memory. The method includes obtaining a three-dimensional scene model of a physical environment including a plurality of points, wherein each of the plurality of points is associated with a set of coordinates in a three-dimensional space, wherein a subset of the plurality of points is associated with a particular cluster identifier and a particular semantic label. The method includes retrieving a three-dimensional object model based on the particular semantic label, the three-dimensional object model including at least a plurality of points. The method includes updating the three-dimensional scene model by replacing the subset of the plurality of points with the three-dimensional object model.

24 Claims, 12 Drawing Sheets

| | | | |
|---|---|---|---|
| 1 | (X1, Y1, Z1) | A | table |
| 2 | (X2, Y2, Z2) | A | table |
| 3 | (X3, Y3, Z3) | A | table |
| 4 | (X4, Y4, Z4) | B | floor |
| 5 | (X5, Y5, Z5) | B | floor |
| 6 | (X6, Y6, Z6) | A | table |
| 7 | (X7, Y7, Z7) | C | cylinder |
| 8 | (X8, Y8, Z8) | C | cylinder |
| 9 | (X9, Y9, Z9) | B | floor |

Figure 5

| 510 | 520 | 530 | 540 | 550 |
|---|---|---|---|---|
| 4 | (X4, Y4, Z4) | B | floor | floor physics |
| 5 | (X5, Y5, Z5) | B | floor | floor physics |
| 7 | (X7, Y7, Z7) | C | cylinder | |
| 8 | (X8, Y8, Z8) | C | cylinder | |
| 9 | (X9, Y9, Z9) | B | floor | floor physics |
| 10 | (X10, Y10, Z10) | A | table | |
| 11 | (X11, Y11, Z11) | A | table | |
| 12 | (X12, Y12, Z12) | A | table | |
| 13 | (X13, Y13, Z13) | A | table | |
| 14 | (X14, Y14, Z14) | A | table | |
| 15 | (X15, Y15, Z15) | A | table | |

Obtaining a three-dimensional scene model of a physical environment including a plurality of points, wherein each of the plurality of points is associated with a set of coordinates in a three-dimensional space, wherein a subset of the plurality of points is associated with a particular cluster identifier and a particular semantic label ⌒1010

Retrieving a three-dimensional object model based on the particular semantic label, the three-dimensional object model including at least a plurality of points ⌒1020

Updating the three-dimensional scene model by replacing the subset of the plurality of points with the three-dimensional object model ⌒1030

Obtaining a three-dimensional scene model of a physical environment including a plurality of points, wherein each of the plurality of points is associated with a set of coordinates in a three-dimensional space, wherein a subset of the plurality of points is associated with a particular cluster identifier and a particular semantic label ⎯1110

Retrieving physics data for the subset of the plurality of points based on the particular semantic label ⎯1120

Updating the three-dimensional scene model by associating the physics data with the subset of the plurality of points ⎯1130

Figure 11

SCENE MODEL ENRICHMENT USING SEMANTIC LABELS

CROSS-REFERENCE TO RELATED APPLICATIONS

This application is a continuation of U.S. patent application Ser. No. 17/158,208, filed on Jan. 26, 2021, which claims priority to U.S. Provisional Patent App. No. 62/982,335, filed on Feb. 27, 2020, and both hereby incorporated by reference herein in their entireties.

TECHNICAL FIELD

The present disclosure generally relates to three-dimensional scene models and, in particular, to systems, methods, and devices for enriching a three-dimensional scene model using semantically labeled point clouds.

BACKGROUND

A point cloud includes a set of points in a three-dimensional space. In various implementations, each point in the point cloud corresponds to a surface of an object in a physical environment. Point clouds can be used to represent a physical environment in various computer vision and/or extended reality (XR) applications.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 illustrates a point cloud data object in accordance with some implementations.

FIG. 7 illustrates an enriched point cloud data object in accordance with some implementations.

FIG. 10 is a flowchart representation of a method of enriching a three-dimensional scene model with a three-dimensional object model based on a semantic label in accordance with some implementations.

FIG. 11 is a flowchart representation of a method of enriching a three-dimensional scene model with physics data based on a semantic label in accordance with some implementations.

Figure 1:
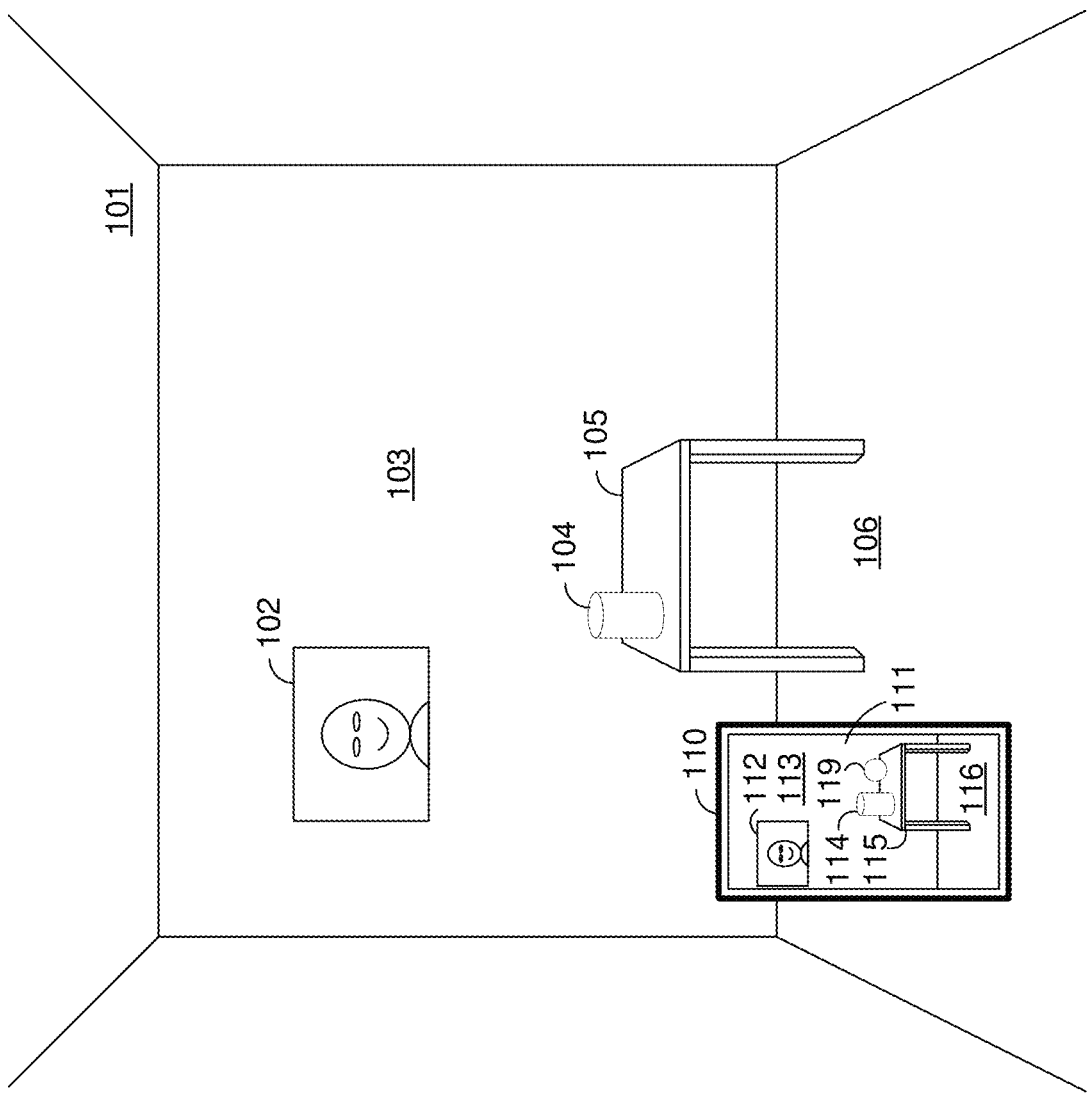
FIG. 1 illustrates a physical environment with a handheld electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for enriching a three-dimensional scene model with a three-dimensional object model based on a semantic label. In various implementations, a method is performed at a device including one or more processors and non-transitory memory. The method includes obtaining a three-dimensional scene model of a physical environment including a plurality of points, wherein each of the plurality of points is associated with a set of coordinates in a three-dimensional space, wherein a subset of the plurality of points is associated with a particular cluster identifier and a particular semantic label. The method includes retrieving a three-dimensional object model based on the particular semantic label, the three-dimensional object model including at least a plurality of points. The method includes updating the three-dimensional scene model by replacing the subset of the plurality of points with the three-dimensional object model.

Various implementations disclosed herein include devices, systems, and methods for enriching a three-dimensional scene model with physics data based on a semantic label. In various implementations, a method is performed at a device including one or more processors and non-transitory memory. The method includes obtaining a three-dimensional scene model of a physical environment including a plurality of points, wherein each of the plurality of points is associated with coordinates in a three-dimensional space, wherein a subset of the plurality of points is associated with a particular cluster identifier and a particular semantic label. The method includes retrieving physics data for the subset of the plurality of points based on the particular semantic label. The method includes updating the three-dimensional scene model by associating the physics data with the subset of the plurality of points.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a physical environment is represented by a point cloud. The point cloud includes a plurality of points, each of the plurality of points associated with at least a set of coordinates in the three-dimensional space and corresponding to a surface of an object in a physical environment. In various implementations, each of the plurality of points is further associated with other data representative of the surface of the object in the physical environment, such as RGB data representative of the color of the surface of the object. In various implementations, at least one of the plurality of points is further associated with a semantic label that represents an object type or identity of the surface of the object. For example, the semantic label may be "tabletop" or "table" or "wall".

The semantically labeled point cloud forms a three-dimensional scene model of the physical environment. In various implementations, the three-dimensional scene model includes one or more semantically labeled object models corresponding to one or more semantically labeled subsets of points of the point cloud. In various implementations, a semantically labeled object model includes a mesh-based model with a plurality of vertices (corresponding to the plurality of points in the subset). In various implementations, the mesh-based model includes one or more edges between vertices, one or more faces surrounded by edges, and/or one or more textures associated with the faces.

In various implementations, as described herein, the semantic labels are used to enrich the three-dimensional scene model. In various implementations, a subset of the plurality of points associated with a particular semantic label are replaced with an object model corresponding to the particular semantic label. In various implementations, the replacement object model is advantageously more compact, more complete, and/or less noisy. In various implementations, one or more points of a subset of the plurality of points associated with a particular semantic label are associated with additional physics data, such as color, texture, reflectivity, rigidity, etc., based on the particular semantic label.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 with a handheld electronic device 110 surveying the physical environment 101. The physical environment 101 includes a picture 102 hanging on a wall 103, a table 105 on the floor 106, and a cylinder 104 on the table 105.

The handheld electronic device 110 displays, on a display, a representation of the physical environment 111 including a representation of the picture 112 hanging on a representation of the wall 113, a representation of the table 115 on a representation of the floor 116, and a representation of the cylinder 114 on the representation of the table 115. In various implementations, the representation of the physical environment 111 is generated based on an image of the physical environment captured with a scene camera of the handheld electronic device 110 having a field-of-view directed toward the physical environment 101.

In addition to the representations of real objects of the physical environment 101, the representation of the physical environment 111 includes a virtual object 119 displayed on the representation of the table 115.

In various implementations, the handheld electronic device 110 includes a single scene camera (or single rear-facing camera disposed on an opposite side of the handheld electronic device 110 as the display). In various implementations, the handheld electronic device 110 includes at least two scene cameras (or at least two rear-facing cameras disposed on an opposite side of the handheld electronic device 110 as the display).

Figure 2B:
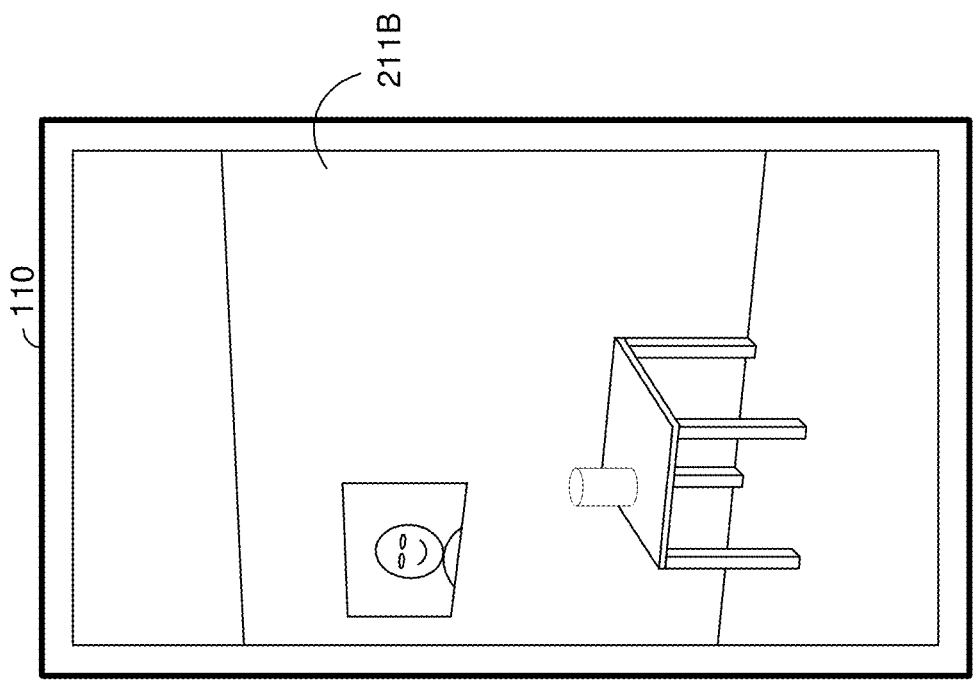
FIGS. 2A and 2B illustrate the handheld electronic device of FIG. 1 displaying two images of the physical environment captured from different perspectives.
Figure 2A:
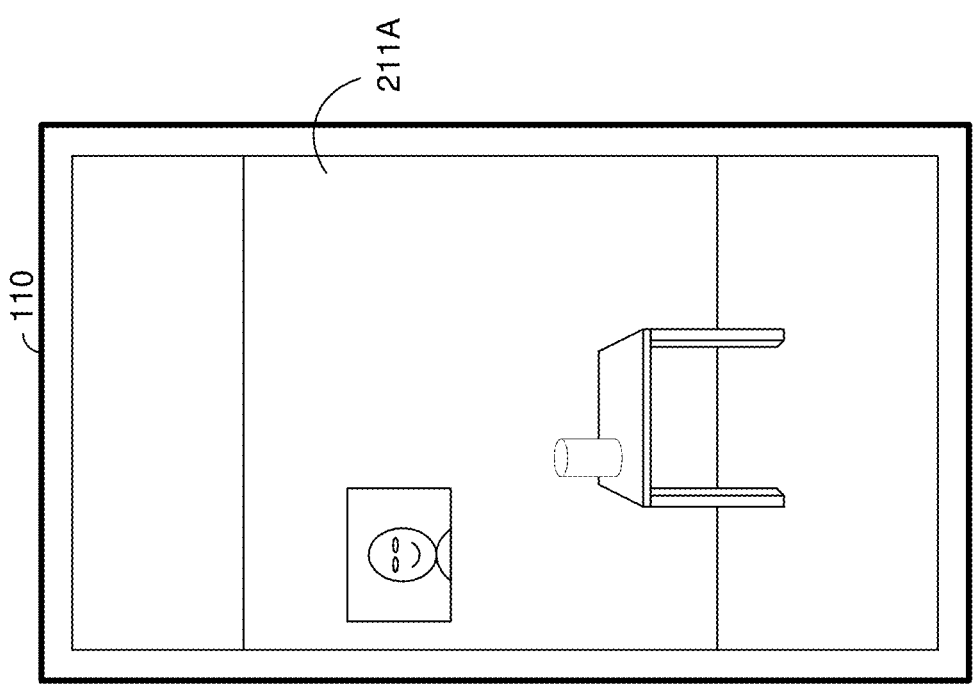

FIG. 2A illustrates the handheld electronic device 110 displaying a first image 211A of the physical environment 101 captured from a first perspective. FIG. 2B illustrates the handheld electronic device 110 displaying a second image 211B of the physical environment 101 captured from a second perspective different from the first perspective.

In various implementations, the first image 211A and the second image 211B are captured by the same camera at different times (e.g., by the same single scene camera at two different times when the handheld electronic device 110 is moved between the two different times). In various implementations, the first image 211A and the second image 211B are captured by different cameras at the same time (e.g., by two scene cameras).

Using a plurality of images of the physical environment 101 captured from a plurality of different perspectives, such as the first image 211A and the second image 211B, the handheld electronic device 110 generates a point cloud of the physical environment 101.

Figure 3B:
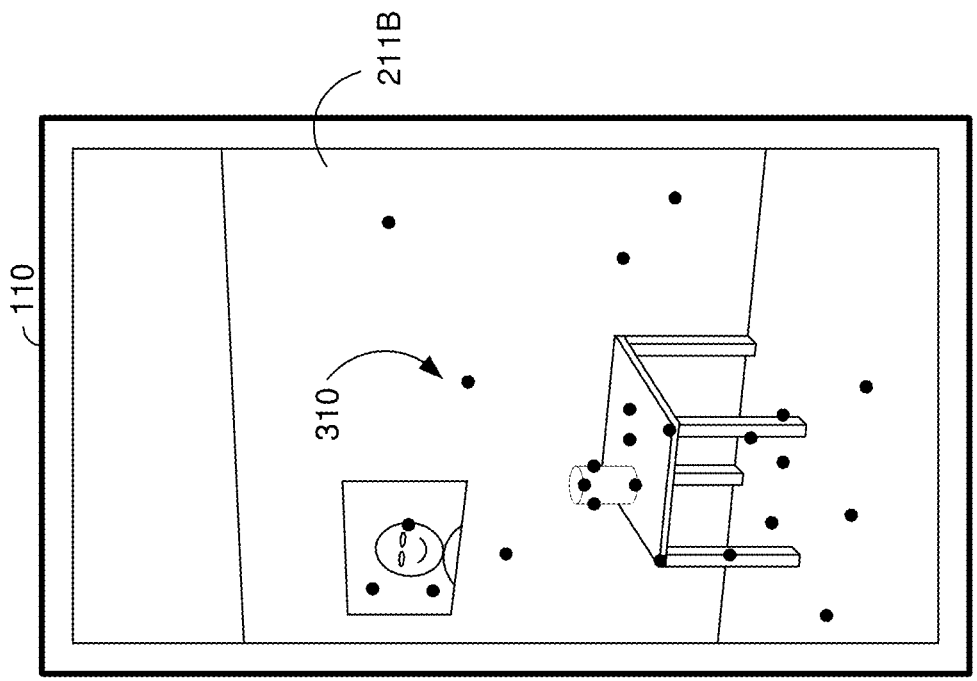
FIGS. 3A and 3B illustrate the handheld electronic device of FIG. 1 displaying the two images overlaid with a representation of a point cloud.
Figure 3A:
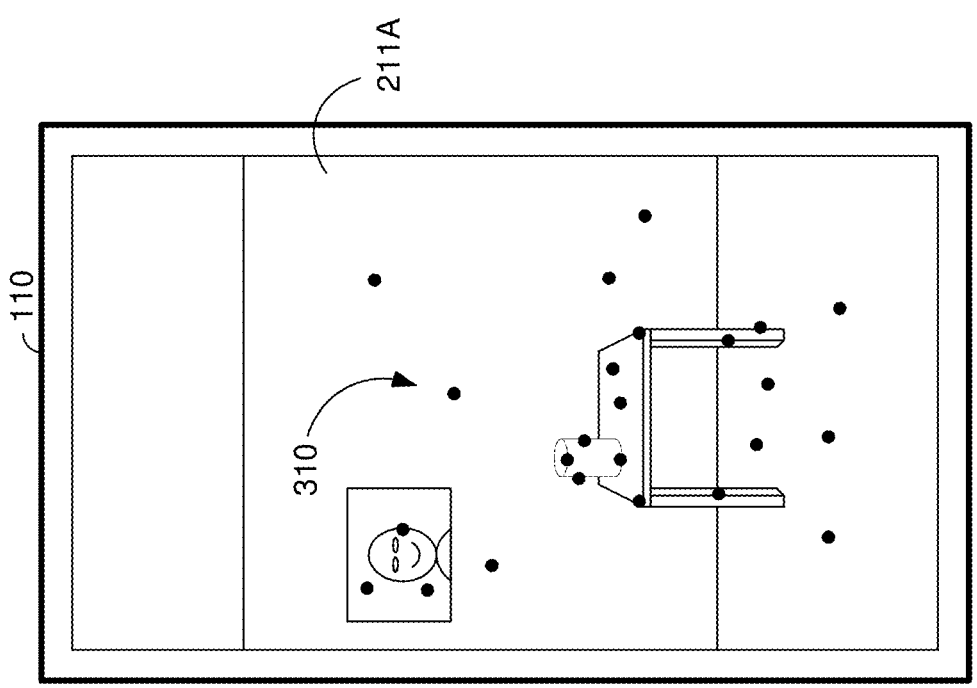

FIG. 3A illustrates the handheld electronic device 110 displaying the first image 211A overlaid with a representation of the point cloud 310. FIG. 3B illustrates the handheld electronic device 110 displaying the second image 211B overlaid with the representation of the point cloud 310.

The point cloud includes a plurality of points, wherein each of the plurality of points is associated with a set of coordinates in a three-dimensional space. For example, in various implementations, each point is associated with an x-coordinate, a y-coordinate, and a z-coordinate. In various implementations, each point in the point cloud corresponds to a feature in the physical environment 101, such as a surface of an object in the physical environment 101.

The handheld electronic device 110 spatially disambiguates the point cloud into a plurality of clusters. Accordingly, each of the clusters includes a subset of the points of the point cloud 310.

Figure 4B:
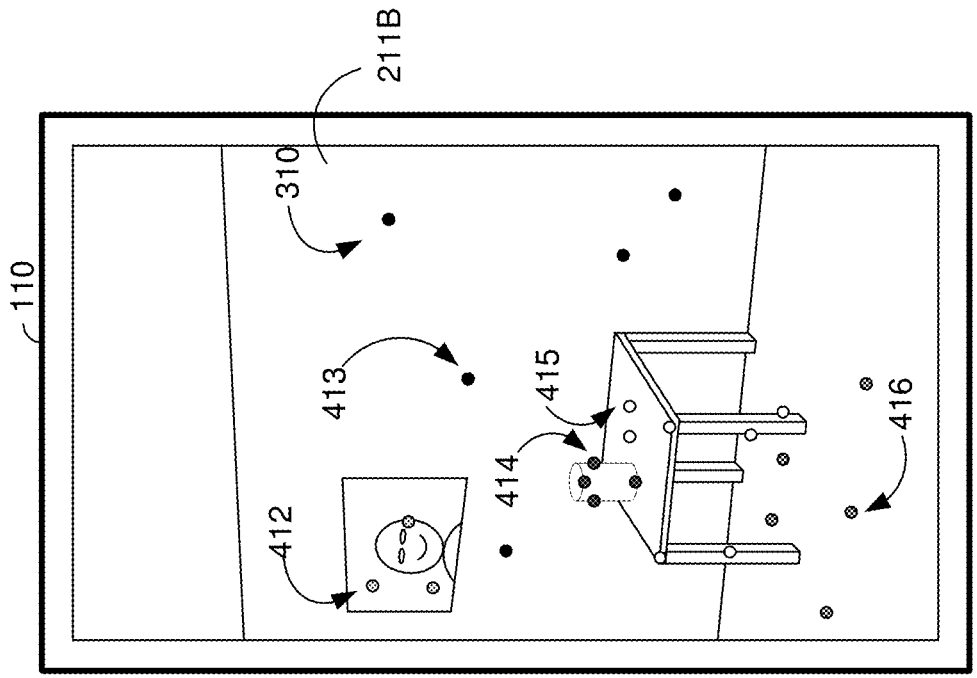
FIGS. 4A and 4B illustrate the handheld electronic device of FIG. 1 displaying the two images overlaid with a representation of the point cloud spatially disambiguated into a plurality of clusters.
Figure 4A:
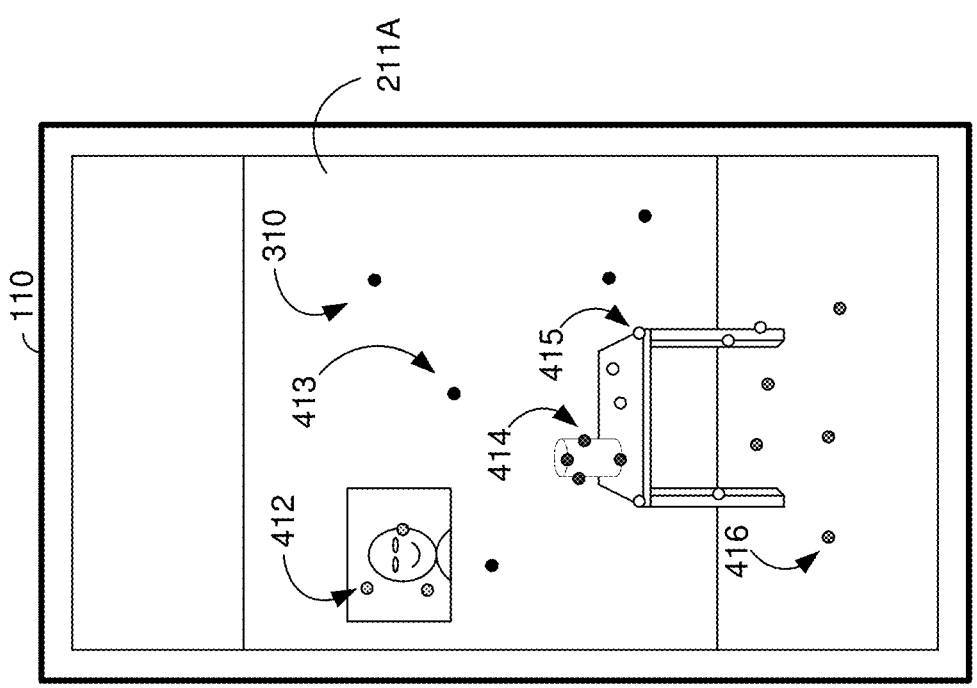

FIG. 4A illustrates the handheld electronic device 110 displaying the first image 211A overlaid with the representation of the point cloud 310 spatially disambiguated into a plurality of clusters 412-416. FIG. 4B illustrates the handheld electronic device 110 displaying the second image 211B overlaid with the representation of the point cloud 310 spatially disambiguated into the plurality of clusters 412-416. The representation of the point cloud 310 includes a first cluster 412 (shown in light gray), a second cluster 413 (shown in black), a third cluster 414 (shown in dark gray), a fourth cluster 415 (shown in white), and a fifth cluster 416 (shown in medium gray).

In various implementations, each of the plurality of clusters is assigned a unique cluster identifier. For example, the clusters may be assigned numbers, letters, or other unique labels.

For each cluster, the handheld electronic device 110 determines a semantic label. In various implementations, each cluster corresponds to an object in the physical environment 101. For example, in FIG. 4A and FIG. 4B, the first cluster 412 corresponds to the picture 102, the second cluster 413 corresponds to the wall 103, the third cluster 414 corresponds to the cylinder 104, the fourth cluster 415 corresponds to the table 105, and the fifth cluster 416 corresponds to the floor 106. In various implementations, the semantic label indicates an object type or identity of the object.

In various implementations, the handheld electronic device 110 stores the semantic label in association with each point of the cluster. FIG. 5 illustrates a point cloud data object 500 in accordance with some implementations. The point cloud data object 500 includes a plurality of data elements (shown as rows in FIG. 5), wherein each data element is associated with a particular point of a point cloud. The data element for a particular point includes a point identifier field 510 that includes a point identifier of a particular point. As an example, the point identifier may be a unique number. The data element for the particular point includes a coordinate field 520 that includes a set of coordinates in a three-dimensional space of the particular point. The data element for the particular point includes a cluster identifier field 530 that includes an identifier of the cluster into which the particular point is spatially disambiguated. As an example, the cluster identifier may be a letter or number. The data element for the particular point includes a semantic label field 540 that includes a semantic label for the cluster into which the particular point is spatially disambiguated.

The semantic labels may be stored in association with the point cloud in other ways. For example, the point cloud may be stored as a set of cluster objects, each cluster object including a cluster identifier for a particular cluster, a semantic label of the particular cluster, and a plurality of sets of coordinates corresponding to the plurality of points spatially disambiguated into the particular cluster.

The handheld electronic device 110 can use the semantic labels in a variety of ways. For example, in various implementations, the handheld electronic device 110 can display a virtual object, such as a virtual ball, on the top of a cluster labeled as a "table", but not on the top of a cluster labeled as a "floor". In various implementations, the handheld electronic device 110 can display a virtual object, such as a virtual painting, over a cluster labeled as a "picture", but not over a cluster labeled as a "television".

The semantically labeled point cloud forms a three-dimensional scene model of the physical environment. In various implementations, the three-dimensional scene model includes one or more semantically labeled object models corresponding to one or more semantically labeled clusters of the point cloud. In various implementations, a semantically labeled object model includes a mesh-based model with a plurality of vertices (corresponding to the plurality of points in the cluster). In various implementations, the mesh-based model includes one or more edges between vertices, one or more faces surrounded by edges, and/or one or more textures associated with the faces.

In various implementations, the semantic labels are used to enrich the three-dimensional scene model. In various implementations, a cluster associated with a particular semantic label is replaced with an object model corresponding to the particular semantic label. In various implementations, one or more points of a cluster associated with a particular semantic label are associated with additional physics data, such as color, texture, reflectivity, rigidity, etc., based on the particular semantic label.

Figure 6A:
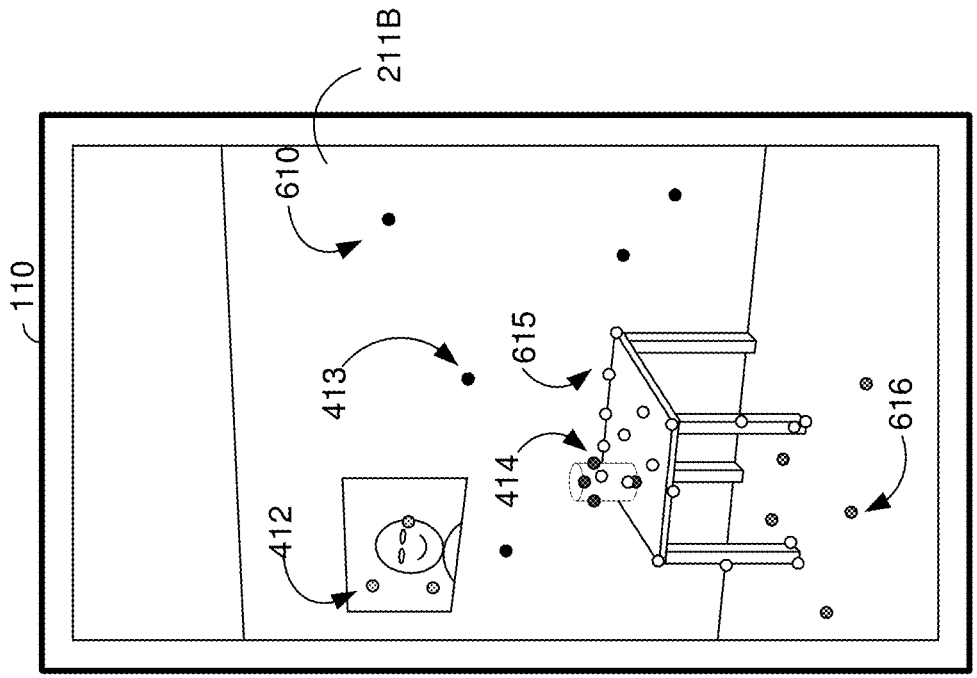
FIGS. 6A and 6B illustrates the handheld electronic device of FIG. 1 displaying the two images overlaid with the representation of an enriched point cloud.
Figure 6B:
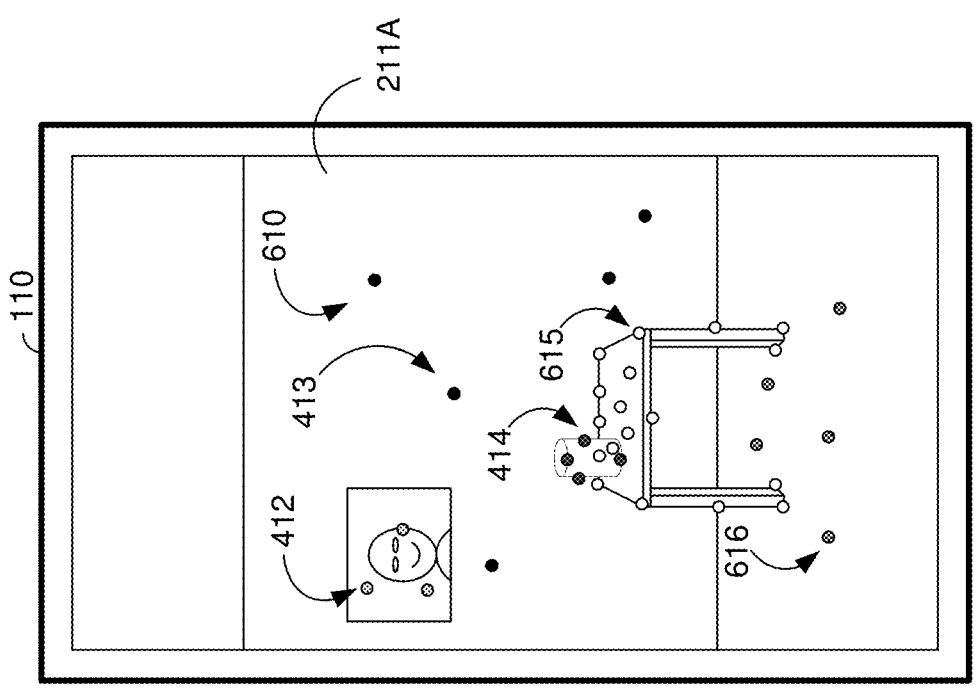

FIG. 6A illustrates the handheld electronic device 110 displaying the first image 211A overlaid with the representation of an enriched point cloud 610. FIG. 6B illustrates the handheld electronic device 110 displaying the second image 211B overlaid with the representation of the enriched point cloud 610.

The representation of the enriched point cloud 610 includes the first cluster 412 (shown in light gray), the second cluster 413 (shown in black), and the third cluster 414 (shown in dark gray). The representation of the enriched point cloud 610 includes an enriched fourth cluster 615 (shown in white) and an enriched fifth cluster 616 (shown in medium gray).

Based on the semantic label of "table" of the fourth cluster 415, the handheld electronic device 110 replaces the points of the fourth cluster 415 with an object model of a table. The object model of the table includes a plurality of points (e.g., as a cluster of points or as vertices of a mesh-based model) represented by the enriched fourth cluster 615. Notably, the enriched fourth cluster 615 includes points corresponding to features of the table 105 that are visually occluded by the cylinder 104 (e.g., beneath the cylinder 104) as well as points corresponding to features of the table 105 that are not visible in either the first image 211A or the second image 211B, e.g., the underside of the table 105.

Based on the semantic label of "floor" of the fifth cluster 416, the handheld electronic device 110 associates physics data with the points of the fifth cluster 416 to generate an enriched fifth cluster 616. The number and coordinates of the points of the enriched fifth cluster 616 are the same as the number and coordinates of the points of the fifth cluster 416.

FIG. 7 illustrates an enriched point cloud data object 700 in accordance with some implementations. The enriched point cloud data object 700 includes a plurality of data elements (shown as rows in FIG. 7), wherein each data element is associated with a particular point of a point cloud.

As compared to the point cloud data object 500 of FIG. 5, in the enriched point cloud data object 700 of FIG. 7, the data elements of points corresponding to Cluster A associated with a semantic label of "table" (e.g., points 1, 2, 3, and 6) have been replaced with new data elements of points 10-15 corresponding to the table object model.

Further, as compared to the point cloud data object 500 of FIG. 5, in the enriched point cloud data object 700 of FIG. 7, the data elements of points corresponding to Cluster B associated with a semantic label of "floor" (e.g., points 4, 5, and 9) include a physics data field 550 that includes physics data for modeling interactions with the floor.

In various implementations, the table object model further includes physics data. Accordingly, in various implementations, the data elements of points corresponding to the table object model in the enriched point cloud data object 700 further include the physics data field 550 that includes physics data for modeling interactions with the table.

Figure 8C:
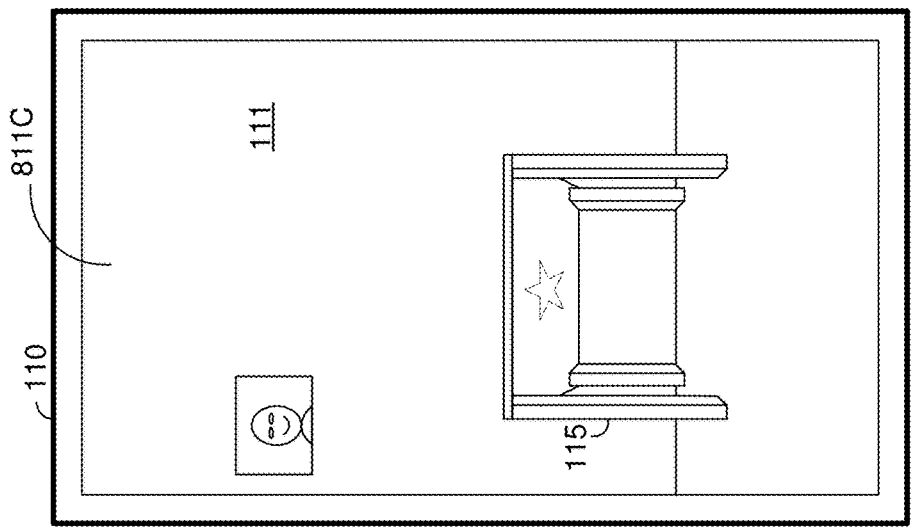
FIGS. 8A-8C illustrate the handheld electronic device of FIG. 1 displaying images while executing a first XR application.
Figure 8B:
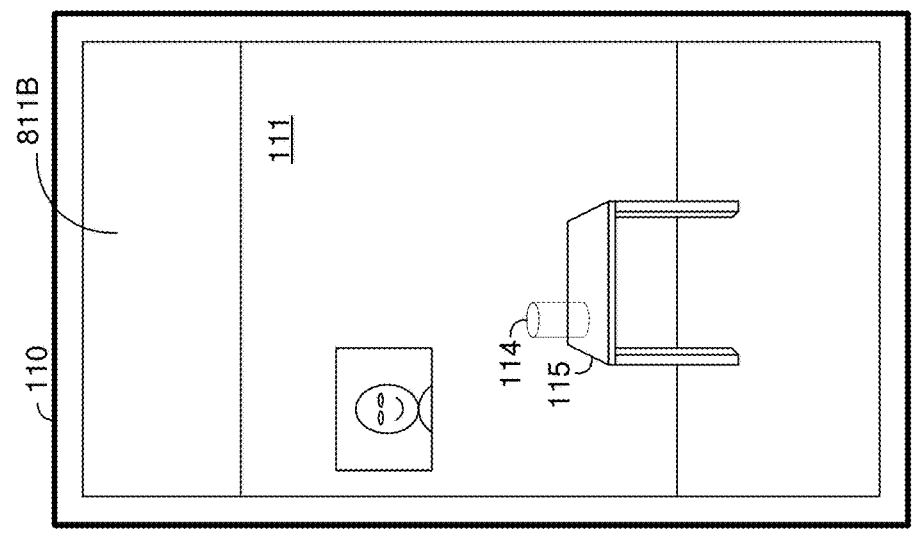
Figure 8A:
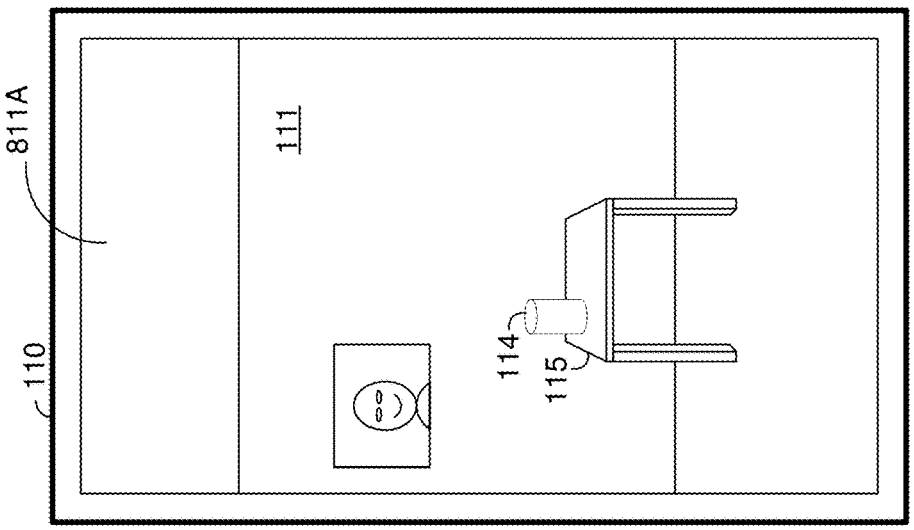

FIG. 8A illustrates the handheld electronic device 110 displaying a first image 811A while executing a first XR application at a first time. At the first time, the first XR application displays the representation of the physical environment 111 including the representation of the cylinder 114 on the representation of the table 115.

FIG. 8B illustrates the handheld electronic device 110 displaying a second image 811B while executing the first XR application at a second time. At the second time, the XR application displays the representation of the physical environment 111 in which the transparency of the representation of the cylinder 114 has been altered. For example, in various implementations, the handheld electronic device 110 detects a user input selecting the representation of the cylinder 114 and requesting a change in transparency of the representation of the cylinder 114.

Thus, the handheld electronic device 110 displays a representation of the physical environment 111 that includes portions that cannot be seen in the physical environment (e.g., because the portion of the table 105 beneath the cylinder 104 is visually occluded by the cylinder 104). These portions are renderable by the handheld electronic device 110 because, unlike the point cloud data object 500 of FIG. 5, the enriched point cloud data object 700 of FIG. 7 includes points corresponding these portions.

FIG. 8C illustrates the handheld electronic device 110 displaying a third image 811C while executing the first XR application at a third time. At the third time, the XR application displays the representation of the physical environment 111 from a third perspective different than the first perspective of the first image 211A of FIG. 2A and the second perspective of the second image 211B of FIG. 2B. In various implementations, the handheld electronic device 110 displays the representation of the physical environment 111 from the third perspective without moving the handheld electronic device 110 to the third perspective. For example, in various implementations, the handheld electronic device 110 detects a user input requesting a change in perspective of the representation of the physical environment 111.

Thus, the handheld electronic device 110 displays a representation of the physical environment 111 that includes portions of which the handheld electronic device 110 has not captured images (e.g., the underside of the representation of table 115, revealing a star). These portions are renderable by the handheld electronic device 110 because, unlike the point cloud data object 500 of FIG. 5, the enriched point cloud data object 700 of FIG. 7 includes points corresponding these portions.

Figure 9C:
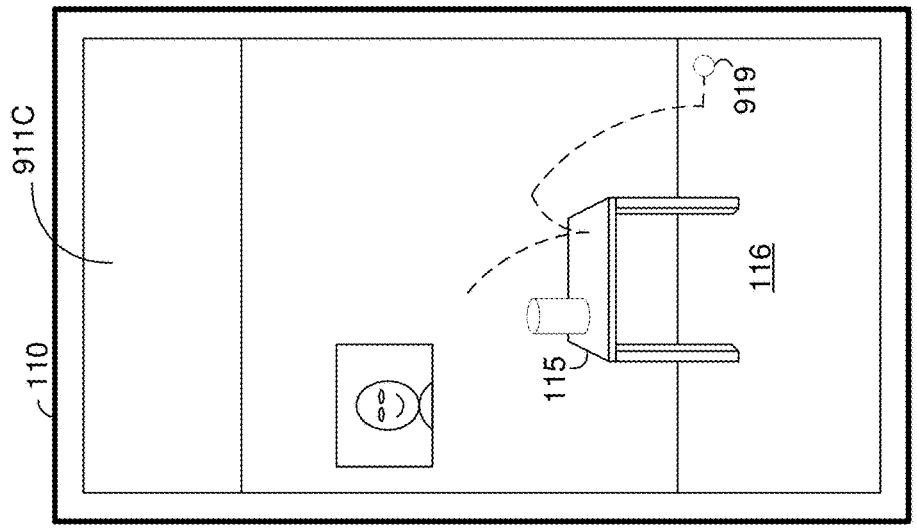
FIGS. 9A-9C illustrates the handheld electronic device of FIG. 1 images while executing a second XR application.
Figure 9B:
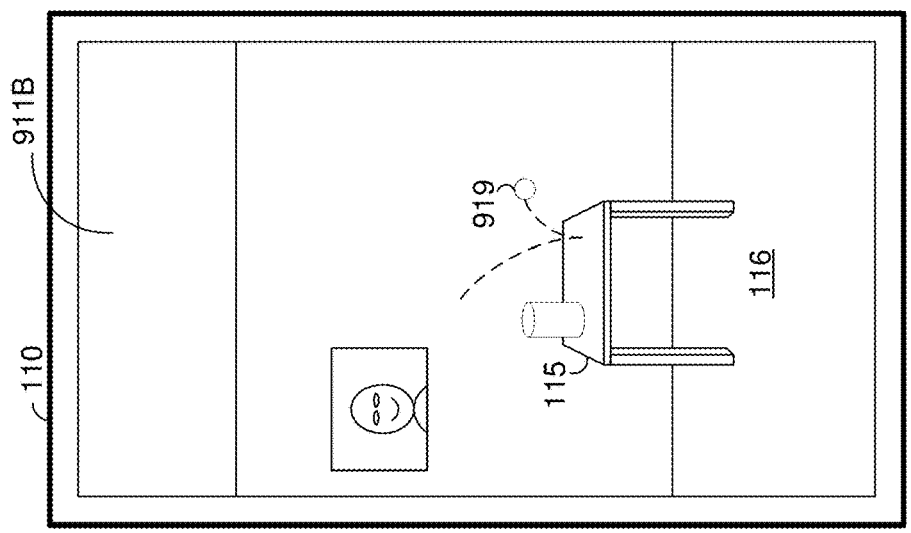
Figure 9A:
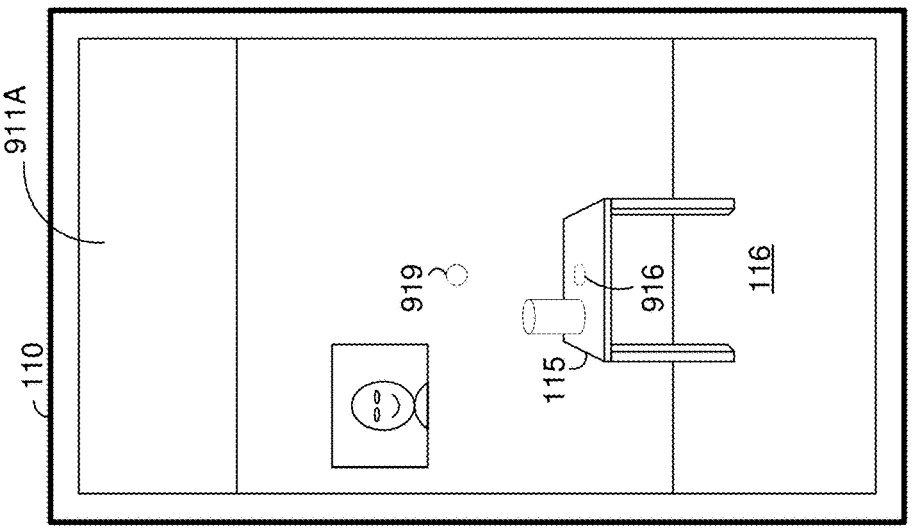

FIG. 9A illustrates the handheld electronic device 110 displaying a first image 911A while executing a second XR application at a first time. At the first time, the second XR application displays the representation of the physical environment 111 including the representation of the table 115 on the representation of the floor 116. The representation of the physical environment 111 further includes a virtual ball 919 above the representation of the table 115.

Based on the physics data associated with the enriched fourth cluster 615 (e.g., a tabletop with a reflective sheen), the representation of the physical environment 111 further includes a reflection of the virtual ball 916 displayed on the representation of the table 115.

FIG. 9B illustrates the handheld electronic device 110 displaying a second image 911B while executing the second XR application at a second time. At the second time, the virtual ball 919 has dropped towards the representation of the table 115 and, based on the physics data associated with the enriched fourth cluster 615 (e.g., a tabletop with high rigidity), has bounced off the representation of the table 115.

FIG. 9C illustrates the handheld electronic device 110 displaying a third image 911C while executing the second XR application at a third time. At the third time, the virtual ball has dropped to the representation of the floor 116 and, based on the physics data associated with the enriched fifth cluster 616 (e.g., a carpeted floor with low rigidity), has rolled a short distance before coming to a stop.

Thus, based on the different physics data associated with the enriched fourth cluster 615 and the enriched fifth cluster 616, the virtual ball interacts differently with the representation of the table 115 and the representation of the floor 116.

FIG. 10 is a flowchart representation of a method 1000 of enriching a three-dimensional scene model with a three-dimensional object model based on a semantic label in accordance with some implementations. In various implementations, the method 1000 is performed by a device with one or more processors and non-transitory memory. In some implementations, the method 1000 is performed by processing logic, including hardware, firmware, software, or a combination thereof. In some implementations, the method 1000 is performed by a processor executing instructions (e.g., code) stored in a non-transitory computer-readable medium (e.g., a memory).

The method 1000 begins, in block 1010, with the device obtaining a three-dimensional scene model of a physical environment including a plurality of points, wherein each of the plurality of points is associated with a set of coordinates in a three-dimensional space, wherein a subset of the plurality of points is associated with a particular cluster identifier and a particular semantic label.

In various implementations, the three-dimensional scene model includes the plurality of points as vertices of one or more mesh-based object models, wherein the one or more mesh-based object models include one or more edges between the vertices. In various implementations, the mesh-based object models further include one or more faces surrounded by edges, one or more textures associated with the faces, and/or a semantic label, object/cluster identifier, physics data or other information associated with the mesh-based object model.

The plurality of points, alone or as the vertices of mesh-based object models, are a point cloud. Accordingly, in various implementations, obtaining the first three-dimensional scene model includes obtaining a point cloud.

In various implementations, obtaining the point cloud includes obtaining a plurality of images of the physical environment from a plurality of different perspectives and generating the point cloud based on the plurality of images of the physical environment. For example, in various implementations, the device detects the same feature in two or more images of the physical environment and using perspective transform geometry, determines the sets of coordinates in the three-dimensional space of the feature. In various implementations, the plurality of images is captured by the same camera at different times (e.g., by the same single scene camera of the device at different times when the device is moved between the times). In various implementations, the plurality of images is captured by different cameras of the device at the same time (e.g., by multiple scene cameras).

In various implementations, obtaining the point cloud includes obtaining an image of a physical environment, obtaining a depth map of the image of the physical environment, and generating the point cloud based on the image of the physical environment and the depth map. In various implementations, the image is captured by a scene camera of the device and the depth map is generated by a depth sensor of the device.

In various implementations, obtaining the point cloud includes using a 3D scanner to generate the point cloud.

In various implementations, each point is associated with additional data. In various implementations, each point is associated with a color. In various implementations, each point is associated with a color-variation indicating how the point changes color over time. As an example, such information may be useful in discriminating between a semantic label of a "picture" or a "television". In various implementations, each point is associated with a confidence indicating a probability that the coordinates in the three-dimensional space of the point is the true location of the corresponding surface of the object in the physical environment.

In various implementations, obtaining the three-dimensional scene model includes spatially disambiguating portions of the plurality of points into a plurality of clusters including the subset of the plurality of points. Each cluster includes a subset of the plurality of points of the point cloud. In various implementations, particular points of the plurality of points (e.g., those designated as noise) are not included in any of the plurality of clusters.

Various point cloud clustering algorithms can be used to spatially disambiguate the point cloud. In various implementations, spatially disambiguating portions of the plurality of points into the plurality of clusters includes performing plane model segmentation. Accordingly, certain clusters of the plurality of clusters correspond to sets of points of the point cloud that lie in the same plane. In various implementations, spatially disambiguating portions of the plurality of points into the plurality of clusters includes performing Euclidean cluster extraction.

In various implementations, obtaining the three-dimensional scene model of the physical environment includes determining the particular semantic label based on the volumetric arrangement of the subset of the plurality of points. In various implementations, the device determines a semantic label for each of the plurality of clusters.

In various implementations, the device determines the particular semantic label by determining a flatness of the subset of the plurality of points. For example, if a bounding box surrounding the subset of the plurality of points has a depth in a dimension that is substantially smaller than its height and width, the subset of the plurality of points is "flat." If the flat subset of the plurality of points is vertical, the device determines a semantic label of "wall". If the flat subset of the plurality of points is horizontal, the device determines a semantic label of "tabletop", but if the subset of the plurality of points is the lowest such horizontal cluster, the device determines a semantic label of "floor".

In various implementations, the device determines the particular semantic label with a neural network. In particular, the device applies a neural network to the sets of coordinates in the three-dimensional space of the points of the subset of the plurality of point to generate a semantic label.

In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, the sets of coordinates in the three-dimensional space of the points of the subset of the plurality of points. In various implementations, the neural network provides, as an output, a semantic label for the subset of the plurality of points.

As noted above, in various implementations, each point is associated with additional data. In various implementations, the additional data is also provided as an input to the neural network. For example, in various implementations, the color or color variation of each point of the subset of the plurality of points is provided to the neural network. In various implementations, the confidence of each point of the subset of the plurality of points is provided to the neural network.

In various implementations, the neural network is trained for a variety of object types. For each object type, training data in the form of point clouds of objects of the object type is provided. More particularly, training data in the form of the sets of coordinates in the three-dimensional space of the points of the point cloud are provided. Thus, the neural network is trained with many different point clouds of different tables to train the neural network to classify clusters as a "table". Similarly, the neural network is trained with many different point clouds of different chairs to train the neural network to classify clusters as a "chair".

In various implementations, the neural network includes a plurality of neural network detectors, each trained for a different object type. Each neural network detector, trained on point clouds of objects of the particular object type, provides, as an output, a probability that a particular subset of the plurality of points corresponds to the particular object type in response to receiving the sets of coordinates in the three-dimensional space of the points of the particular subset of the plurality of points. Thus, in response to receiving the sets of coordinates in the three-dimensional space of the points of a particular subset of the plurality of points, a neural network detector for tables may output a 0.9, a neural network detector for chairs may output a 0.5, and a neural network detector for cylinders may output a 0.2. The semantic label is determined based on the greatest output.

In various implementations, the device determines multiple semantic labels for the subset of the plurality of points. In various implementations, the device determines a series of hierarchical or layered semantic labels for the subset of the plurality of points. For example, the device determines a number of semantic labels that identity the object represented by the subset of the plurality of points with increasing degrees of specificity. For example, the device determines a first semantic label of "flat" for the subset of the plurality of points indicating that the cluster has one dimension substantially smaller than the other two. The device then determines a second semantic label of "horizontal" indicating that the flat subset of the plurality of points is horizontal, e.g., like a floor or tabletop rather than vertical like a wall or picture. The device then determines a third semantic label of "floor" indicating that that the flat, horizontal subset of the plurality of points is a floor rather than a table or ceiling. The device then determines a fourth semantic label of "carpet" indicating that the floor is carpeted rather than tile or hardwood floor.

In various implementations, the device determines sub-labels associated with sub-clusters of the subset of the plurality of points. In various implementations, the method includes spatially disambiguating portions of the subset of the plurality of points into a plurality of sub-clusters and determining a semantic sub-label based on the volumetric arrangement of the points of a particular sub-cluster of the plurality of sub-clusters. For example, in various implementations, the device determines a first semantic label of "table" for the subset of the plurality of points. After spatially disambiguating the table subset of the plurality of points into a plurality of sub-clusters, a first semantic sub-label of "tabletop" is determined for a first sub-cluster, whereas a second semantic sub-label of "leg" is determined for a second sub-cluster.

The method 1000 continues, in block 1020, with the device retrieving a three-dimensional object model based on the particular semantic label, the three-dimensional object model including at least a plurality of points. In various implementations, the three-dimensional object model includes the plurality of points of the three-dimensional object model as vertices of a mesh-based object model, wherein the mesh-based object model includes one or more edges between the vertices. In various implementations, the three-dimensional object model further includes color data, texture data, or physics data associated with the plurality of points of the three-dimensional object model.

In various implementations, the device retrieves the three-dimensional object model from a database based on the semantic label. For example, if the particular semantic label is "table", the device retrieves a three-dimensional object model with a label of "table" from a database of labeled three-dimensional object models. In various implementations, the device retrieves the three-dimensional object model further based on volumetric arrangement of the subset of the plurality of points. For example, if the particular semantic label is "chair", the device retrieves a three-dimensional object model with a label of "chair" from a plurality of three-dimensional object models with a label of "chair" in a database based on which of the three-dimensional object models with a label of "chair" most closely matches the shape of the subset of the plurality of points.

In various implementations, the device alters the three-dimensional object model based on the subset of the plurality of points. For example, if the particular semantic label is "cylinder", the device retrieves a three-dimensional object model with a label of "cylinder" and sets a height and diameter of the three-dimensional object model based on the volumetric arrangement of the subset of the plurality of points. As another example, if the particular semantic label is "couch", the device retrieves a three-dimensional object model with a label of "couch" and deforms a cushion portion of the three-dimensional object model to more closely match the sets of coordinates of the subset of the plurality of points corresponding to the cushion portion of the three-dimensional object model.

The method 1000 continues, in block 1030, with the device updating the three-dimensional scene model by replacing the subset of the plurality of points with the three-dimensional object model. In various implementations, replacing the subset of the plurality of points includes removing the subset of the plurality of points associated with the particular cluster identifier from the three-dimensional scene model and adding the plurality of points of the three-dimensional object model to the three-dimensional scene model.

In various implementations, obtaining the three-dimensional scene model includes obtaining an image of the physical environment, obtaining a depth map of the image of the physical environment, and generating the three-dimensional scene model based on the image of the physical environment and the depth map. In various implementations, the plurality of points of the three-dimensional scene model includes points corresponding to features of the physical environment not visible in the image of the physical environment.

Similarly, in various implementations, obtaining the three-dimensional scene model includes obtaining a plurality of images of the physical environment from a plurality of different perspectives and generating the three-dimensional scene model based on the plurality of images of the physical environment. In various implementations, the plurality of points of the three-dimensional object model includes points corresponding to features of the physical environment not visible in the plurality of images of the physical environment.

In various implementations, the method 1000 further includes displaying a representation of the physical environment from a virtual camera perspective in which representations of the features of the physical environment (not visible in the image of the physical environment or in the plurality of images of the physical environment) are displayed. For example, in FIG. 8C, the handheld electronic device 110 displays a representation of the physical environment 111 including the underside of a representation of the table 115.

In various implementations, the method 1000 further includes displaying a representation of the physical environment including a representation of a first object of the physical environment and a representation of a second object of the physical environment corresponding to the three-dimensional object model. In various implementations, the first object visually occludes at least a portion of the second object. In various implementations, an occlusiveness of the representation of the first object is set such that the corresponding portion of the representation of the second object is displayed. For example, in FIG. 8B, the handheld electronic device 110 displays a representation of the physical environment 111 including a representation of the cylinder 114 and a representation of the table 115. The cylinder 104 visually occludes at least a portion of the table 105. The transparency of the representation of the cylinder 114 is set such that the previously occluded portion of the representation of the table 115 is displayed. In various implementations, the device sets a transparency of the representation of the first object. In various implementations, the device sets a location of the representation of the first object (e.g., moves the representation of the cylinder 114 from the left side of the representation of the table 115 to the right side of the representation of the table 114). In various implementations, the device sets a visibility of the representation of the first object (e.g., does not display the representation of the first object.)

FIG. 11 is a flowchart representation of a method 1100 of enriching a three-dimensional scene model with physics data based on a semantic label in accordance with some implementations. In various implementations, the method 1100 is performed by a device with one or more processors and non-transitory memory. In some implementations, the method 1100 is performed by processing logic, including hardware, firmware, software, or a combination thereof. In some implementations, the method 1100 is performed by a processor executing instructions (e.g., code) stored in a non-transitory computer-readable medium (e.g., a memory).

The method 1100 begins, in block 1110, with the device obtaining a three-dimensional scene model of a physical environment including a plurality of points, wherein each of the plurality of points is associated with a set of coordinates in a three-dimensional space, wherein a subset of the plurality of points is associated with a particular cluster identifier and a particular semantic label.

In various implementations, the three-dimensional scene model includes the plurality of points as vertices of one or more mesh-based object models, wherein the one or more mesh-based object models include one or more edges between the vertices. In various implementations, the mesh-based object models further include one or more faces surrounded by edges, one or more textures associated with the faces, and/or a semantic label, object/cluster identifier, physics data or other information associated with the mesh-based object model.

The plurality of points, alone or as the vertices of mesh-based object models, are a point cloud. Accordingly, in various implementations, obtaining the first three-dimensional scene model includes obtaining a point cloud.

In various implementations, obtaining the point cloud includes obtaining a plurality of images of the physical environment from a plurality of different perspectives and generating the point cloud based on the plurality of images of the physical environment. For example, in various implementations, the device detects the same feature in two or more images of the physical environment and using perspective transform geometry, determines the sets of coordinates in the three-dimensional space of the feature. In various implementations, the plurality of images is captured by the same camera at different times (e.g., by the same single scene camera of the device at different times when the device is moved between the times). In various implementations, the plurality of images is captured by different cameras of the device at the same time (e.g., by multiple scene cameras).

In various implementations, obtaining the point cloud includes obtaining an image of a physical environment, obtaining a depth map of the image of the physical environment, and generating the point cloud based on the image of the physical environment and the depth map. In various implementations, the image is captured by a scene camera of the device and the depth map is generated by a depth sensor of the device.

In various implementations, obtaining the point cloud includes using a 3D scanner to generate the point cloud.

In various implementations, each point is associated with additional data. In various implementations, each point is associated with a color. In various implementations, each point is associated with a color-variation indicating how the point changes color over time. As an example, such information may be useful in discriminating between a semantic label of a "picture" or a "television". In various implementations, each point is associated with a confidence indicating a probability that the coordinates in the three-dimensional space of the point is the true location of the corresponding surface of the object in the physical environment.

In various implementations, obtaining the three-dimensional scene model includes spatially disambiguating portions of the plurality of points into a plurality of clusters including the subset of the plurality of points. Each cluster includes a subset of the plurality of points of the point cloud. In various implementations, particular points of the plurality of points (e.g., those designated as noise) are not included in any of the plurality of clusters.

Various point cloud clustering algorithms can be used to spatially disambiguate the point cloud. In various implementations, spatially disambiguating portions of the plurality of points into the plurality of clusters includes performing plane model segmentation. Accordingly, certain clusters of the plurality of clusters correspond to sets of points of the point cloud that lie in the same plane. In various implementations, spatially disambiguating portions of the plurality of points into the plurality of clusters includes performing Euclidean cluster extraction.

In various implementations, obtaining the three-dimensional scene model of the physical environment includes determining the particular semantic label based on the volumetric arrangement of the subset of the plurality of points. In various implementations, the device determines a semantic label for each of the plurality of clusters.

In various implementations, the device determines the particular semantic label by determining a flatness of the subset of the plurality of points. For example, if a bounding box surrounding the subset of the plurality of points has a depth in a dimension that is substantially smaller than its height and width, the subset of the plurality of points is "flat." If the flat subset of the plurality of points is vertical, the device determines a semantic label of "wall". If the flat subset of the plurality of points is horizontal, the device determines a semantic label of "tabletop", but if the subset of the plurality of points is the lowest such horizontal cluster, the device determines a semantic label of "floor".

In various implementations, the device determines the particular semantic label with a neural network. In particular, the device applies a neural network to the sets of coordinates in the three-dimensional space of the points of the subset of the plurality of point to generate a semantic label.

In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, the sets of coordinates in the three-dimensional space of the points of the subset of the plurality of points. In various implementations, the neural network provides, as an output, a semantic label for the subset of the plurality of points.

As noted above, in various implementations, each point is associated with additional data. In various implementations, the additional data is also provided as an input to the neural network. For example, in various implementations, the color or color variation of each point of the subset of the plurality of points is provided to the neural network. In various implementations, the confidence of each point of the subset of the plurality of points is provided to the neural network.

In various implementations, the neural network is trained for a variety of object types. For each object type, training data in the form of point clouds of objects of the object type is provided. More particularly, training data in the form of the sets of coordinates in the three-dimensional space of the points of the point cloud are provided. Thus, the neural network is trained with many different point clouds of different tables to train the neural network to classify clusters as a "table". Similarly, the neural network is trained with many different point clouds of different chairs to train the neural network to classify clusters as a "chair".

In various implementations, the neural network includes a plurality of neural network detectors, each trained for a different object type. Each neural network detector, trained on point clouds of objects of the particular object type, provides, as an output, a probability that a particular subset of the plurality of points corresponds to the particular object type in response to receiving the sets of coordinates in the three-dimensional space of the points of the particular subset of the plurality of points. Thus, in response to receiving the sets of coordinates in the three-dimensional space of the points of a particular subset of the plurality of points, a neural network detector for tables may output a 0.9, a neural network detector for chairs may output a 0.5, and a neural network detector for cylinders may output a 0.2. The semantic label is determined based on the greatest output.

In various implementations, the device determines multiple semantic labels for the subset of the plurality of points. In various implementations, the device determines a series of hierarchical or layered semantic labels for the subset of the plurality of points. For example, the device determines a number of semantic labels that identity the object represented by the subset of the plurality of points with increasing degrees of specificity. For example, the device determines a first semantic label of "flat" for the subset of the plurality of points indicating that the cluster has one dimension substantially smaller than the other two. The device then determines a second semantic label of "horizontal" indicating that the flat subset of the plurality of points is horizontal, e.g., like a floor or tabletop rather than vertical like a wall or picture. The device then determines a third semantic label of "floor" indicating that that the flat, horizontal subset of the plurality of points is a floor rather than a table or ceiling. The device then determines a fourth semantic label of "carpet" indicating that the floor is carpeted rather than tile or hardwood floor.

In various implementations, the device determines sub-labels associated with sub-clusters of the subset of the plurality of points. In various implementations, the method includes spatially disambiguating portions of the subset of the plurality of points into a plurality of sub-clusters and determining a semantic sub-label based on the volumetric arrangement of the points of a particular sub-cluster of the plurality of sub-clusters. For example, in various implementations, the device determines a first semantic label of "table" for the subset of the plurality of points. After spatially disambiguating the table subset of the plurality of points into a plurality of sub-clusters, a first semantic sub-label of "tabletop" is determined for a first sub-cluster, whereas a second semantic sub-label of "leg" is determined for a second sub-cluster.

The method 1000 continues, in block 1020, with the device retrieving physics data for the subset of the plurality of points based on the particular semantic label. In various implementations, the physics data includes optical data, such as color, texture, transparency, or reflectivity. In various implementations, the physics data includes a rigidity or elasticity. In various implementations, the physics data includes soft-body modelling parameters, such as mass or spring constants for a mass-spring-damper model or elasticity tensors for finite element simulation.

In various implementations, the device retrieves the physics data from a database based on the semantic label. For example, if the particular semantic label is "table", the device retrieves physics data associated with a label of "table" from a database of labeled sets of physics data.

In various implementations, the device alters the physics based on the subset of the plurality of points. For example, if the subset of the plurality of points corresponds to a tiled floor, in various implementations, the particular semantic label is "tiled floor" and the device retrieves physics data associated with a label of "tiled floor", including optics data indicative of the color and texture of the tiles. However, in various implementations, the device changes some of the color data of particular points of the subset of the plurality of points to represent a crack in one of the tiles or a stain on one of the tiles.

The method 1100 continues, in block 1130, with the device updating the three-dimensional scene model by associating the physics data with the subset of the plurality of points.

As noted above, in various implementations, the physics data includes a color, texture, transparency, or reflectivity. In various implementations, the method 1100 further includes displaying a representation of the physical environment, wherein a representation of the subset of the plurality of points is displayed according to the color, texture, transparency, or reflectivity. For example, in FIG. 9A, a reflection of the virtual ball 916 is displayed on the representation of the table 115 based on physics data indicative of a reflective sheen.

As noted above, in various implementations, the physics data includes a rigidity. In various implementations, the method 1100 further includes displaying a representation of the physical environment including a virtual object, wherein an interaction of the virtual object and a representation of the subset of the plurality of points is displayed according to the rigidity. For example, in FIG. 9B, the virtual ball 919 has bounced off the representation of the table 115 based on physics data indicative of a high rigidity, whereas, in FIG. 9C, the virtual ball 919 has rolled a short distance before coming to a stop based on physics data indicative of a low rigidity.

As noted above, in various implementations, the physics data includes soft-body modelling parameters. In various implementations, the method 1100 further includes displaying a representation of the physical environment including a virtual object, wherein an interaction of the virtual object and a representation of the subset of the plurality of points is displayed according to the soft-body modelling parameters. For example, in various implementations, a virtual ball is displayed on a representation of a couch cushion and the representation of the couch cushion is deformed according to the weight of the virtual ball and the soft-body modelling parameters associated with the couch cushion.

Figure 12:
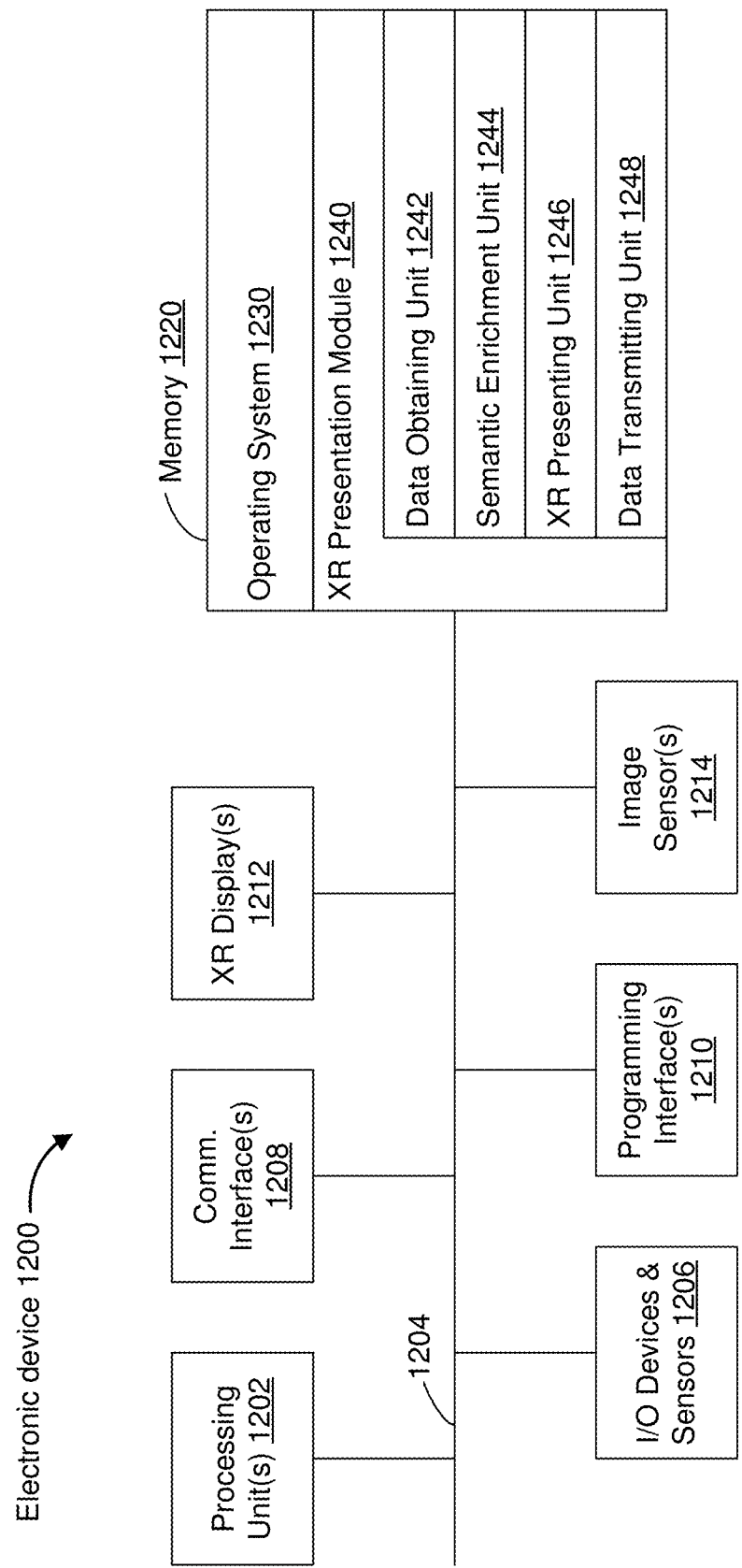
FIG. 12 is a block diagram of an electronic device in accordance with some implementations.

FIG. 12 is a block diagram of an electronic device 1200 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1200 includes one or more processing units 1202 (e.g., microprocessors, ASICs, FPGAs, GPUs, CPUs, processing cores, and/or the like), one or more input/output (I/O) devices and sensors 1206, one or more communication interfaces 1208 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1210, one or more XR displays 1212, one or more optional interior- and/or exterior-facing image sensors 1214, a memory 1220, and one or more communication buses 1204 for interconnecting these and various other components.

In some implementations, the one or more communication buses 1204 include circuitry that interconnects and controls communications between system components. In some implementations, the one or more I/O devices and sensors 1206 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1212 are configured to present XR content to the user. In some implementations, the one or more XR displays 1212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1212 correspond to diffractive, reflective, polarized, holographic, etc. waveguide displays. For example, the electronic device 1200 includes a single XR display. In another example, the electronic device 1200 includes an XR display for each eye of the user. In some implementations, the one or more XR displays 1212 are capable of presenting AR, MR, and/or VR content.

In various implementations, the one or more XR displays 1212 are video passthrough displays which display at least a portion of a physical environment as an image captured by a scene camera. In various implementations, the one or more XR displays 1212 are optical see-through displays which are at least partially transparent and pass light emitted by or reflected off the physical environment.

In some implementations, the one or more image sensors 1214 are configured to obtain image data that corresponds to at least a portion of the face of the user that includes the eyes of the user (any may be referred to as an eye-tracking camera). In some implementations, the one or more image sensors 1214 are configured to be forward-facing so as to obtain image data that corresponds to the physical environment as would be viewed by the user if the electronic device 1200 was not present (and may be referred to as a scene camera). The one or more optional image sensors 1214 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1220 includes high-speed random-access memory, such as DRAM, SRAM, DDR RAM, or other random-access solid-state memory devices. In some implementations, the memory 1220 includes non-volatile memory, such as one or more magnetic disk storage devices, optical disk storage devices, flash memory devices, or other non-volatile solid-state storage devices. The memory 1220 optionally includes one or more storage devices remotely located from the one or more processing units 1202. The memory 1220 comprises a non-transitory computer readable storage medium. In some implementations, the memory 1220 or the non-transitory computer readable storage medium of the memory 1220 stores the following programs, modules and data structures, or a subset thereof including an optional operating system 1230 and an XR presentation module 1240.

The operating system 1230 includes procedures for handling various basic system services and for performing hardware dependent tasks. In some implementations, the XR presentation module 1240 is configured to present XR content to the user via the one or more XR displays 1212. To that end, in various implementations, the XR presentation module 1240 includes a data obtaining unit 1242, a semantic enrichment unit 1244, an XR presenting unit 1246, and a data transmitting unit 1248.

In some implementations, the data obtaining unit 1242 is configured to obtain data (e.g., presentation data, interaction data, sensor data, location data, etc.). The data may be obtained from the one or more processing units 1202 or another electronic device. For example, in various implementations, the data obtaining unit 1242 obtains a point cloud of a physical environment. In various implementations, the data obtaining unit 1242 retrieves a three-dimensional scene model and/or physics data from the memory 1220 and/or an external storage (e.g., via the one or more communication interfaces 1208). To that end, in various implementations, the data obtaining unit 1242 includes instructions and/or logic therefor, and heuristics and metadata therefor.

In some implementations, the semantic enrichment unit 1244 is configured to enrich a three-dimensional scene model based on a semantic label of a subset of a plurality of points of the three-dimensional scene model. To that end, in various implementations, the semantic enrichment unit 1244 includes instructions and/or logic therefor, and heuristics and metadata therefor.

In some implementations, the XR presenting unit 1246 is configured to present XR content via the one or more XR displays 1212. To that end, in various implementations, the XR presenting unit 1246 includes instructions and/or logic therefor, and heuristics and metadata therefor.

In some implementations, the data transmitting unit 1248 is configured to transmit data (e.g., presentation data, location data, etc.) to the one or more processing units 1202, the memory 1220, or another electronic device. To that end, in various implementations, the data transmitting unit 1248 includes instructions and/or logic therefor, and heuristics and metadata therefor.

Although the data obtaining unit 1242, the semantic enrichment unit 1244, the XR presenting unit 1246, and the data transmitting unit 1248 are shown as residing on a single electronic device 1200, it should be understood that in other implementations, any combination of the data obtaining unit 1242, the semantic enrichment unit 1244, the XR presenting unit 1246, and the data transmitting unit 1248 may be located in separate computing devices.

Moreover, FIG. 12 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 12 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device including a processor and non-transitory memory:
   obtaining a three-dimensional scene model of a scene including a plurality of points, wherein each of the plurality of points is associated with coordinates in a three-dimensional space, wherein a subset of the plurality of points is associated with a particular cluster identifier and a particular semantic label;
   retrieving physics data for the subset of the plurality of points based on the particular semantic label; and
   updating the three-dimensional scene model by associating the physics data with the subset of the plurality of points.

2. The method of claim 1, wherein the physics data indicates a color, a texture, a transparency, or a reflectivity.

3. The method of claim 2, further comprising displaying a representation of the scene, wherein a representation of the subset of the plurality of points is displayed according to the color, the texture, the transparency, or the reflectivity.

4. The method of claim 3, wherein the representation of the subset of the plurality of points is displayed with a reflection of a virtual object based on the physics data.

5. The method of claim 1, wherein the physics data indicates a rigidity.

6. The method of claim 5, further comprising displaying a representation of the scene including a virtual object, wherein an interaction of the virtual object and a representation of the subset of the plurality of points is displayed according to the rigidity.

7. The method of claim 1, wherein the physics data includes soft-body modelling parameters.

8. The method of claim 7, further comprising displaying a representation of the scene including a virtual object, wherein an interaction of the virtual object and a representation of the subset of the plurality of points is displayed according to the soft-body modelling parameters.

9. The method of claim 8, wherein the representation of the subset of the plurality of points is displayed as deformed based on the virtual object and the soft-body modelling parameters.

10. The method of claim 1, further comprising altering the physics data based on the subset of the plurality of points.

11. The method of claim 10, wherein altering the physics data includes altering a color indicated by the physics data based on a color of a particular point of the subset of the plurality of points.

12. A device comprising:
a non-transitory memory; and
one or more processors to:
obtain a three-dimensional scene model of a scene including a plurality of points, wherein each of the plurality of points is associated with coordinates in a three-dimensional space, wherein a subset of the plurality of points is associated with a particular cluster identifier and a particular semantic label;
retrieve physics data for the subset of the plurality of points based on the particular semantic label; and
update the three-dimensional scene model by associating the physics data with the subset of the plurality of points.

13. The device of claim 12, wherein the physics data indicates a color, a texture, a transparency, or a reflectivity.

14. The device of claim 13, wherein the one or more processors are further to display a representation of the scene, wherein a representation of the subset of the plurality of points is displayed according to the color, the texture, the transparency, or the reflectivity.

15. The device of claim 12, wherein the physics data indicates a rigidity.

16. The device of claim 15, wherein the one or more processors are further to display a representation of the scene including a virtual object, wherein an interaction of the virtual object and a representation of the subset of the plurality of points is displayed according to the rigidity.

17. The device of claim 12, wherein the physics data includes soft-body modelling parameters.

18. The device of claim 17, wherein the one or more processors are to display a representation of the scene including a virtual object, wherein an interaction of the virtual object and a representation of the subset of the plurality of points is displayed according to the soft-body modelling parameters.

19. The device of claim 12, wherein the one or more processors are further to alter the physics data based on the subset of the plurality of points.

20. A non-transitory memory storing one or more programs, which, when executed by one or more processors of a device, cause the device to:
obtain a three-dimensional scene model of a scene including a plurality of points, wherein each of the plurality of points is associated with coordinates in a three-dimensional space, wherein a subset of the plurality of points is associated with a particular cluster identifier and a particular semantic label;
retrieve physics data for the subset of the plurality of points based on the particular semantic label; and
update the three-dimensional scene model by associating the physics data with the subset of the plurality of points.

21. The non-transitory memory of claim 20, wherein the physics data indicates a color, a texture, a transparency, or a reflectivity.

22. The non-transitory memory of claim 21, wherein the one or more programs further cause the device to display a representation of the scene, wherein a representation of the subset of the plurality of points is displayed according to the color, the texture, the transparency, or the reflectivity.

23. The non-transitory memory of claim 20, wherein the physics data includes soft-body modelling parameters.

24. The non-transitory memory of claim 23, wherein the one or more programs further cause the device to display a representation of the scene including a virtual object, wherein an interaction of the virtual object and a representation of the subset of the plurality of points is displayed according to the soft-body modelling parameters.

* * * * *